Sept. 2, 1969   R. EIDINGER   3,464,135

HOLDER FOR X-RAY FILMS AND REPORTS

Filed April 3, 1967

INVENTOR
ROBERT EIDINGER 3,464,135
HOLDER FOR X-RAY FILMS AND REPORTS
Robert Eidinger, 13185 Coronado Terrace, Keystone
Point, North Miami, Fla. 33161
Filed Apr. 3, 1967, Ser. No. 628,063
Int. Cl. G07f *1/10;* G09f *3/18*
U.S. Cl. 40—159
2 Claims

ABSTRACT OF THE DISCLOSURE

A holder for X-ray films and reports having a pair of rectangular members made of translucent vinyl plastic material open along one edge to form a pocket for X-rays and a second smaller transparent rectangular vinyl plastic member joined along three edges to the one side of the one of the pair of rectangular members to form a second smaller pocket for containing reports of said X-rays.

---

This invention relates to a holder for X-ray films and reports and has as its principal object of the invention the containing of X-ray films and reports on the films in one holder so that they cannot become filed or stored in separate files or folders so as to be lost or separated from each other.

Another object of the present invention is to provide a holder for both an X-ray film and reports on same in a vinyl plastic holder which is transparent and permits one to readily note if either the X-ray films or reports are missing therefrom.

A further object of the present invention is to provide a vinyl plastic holder with two pockets for containing X-ray films and the reports concerning the X-rays which holder is simple in construction, inexpensive in cost and which is readily formed by a high frequency sealing machine.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 1:
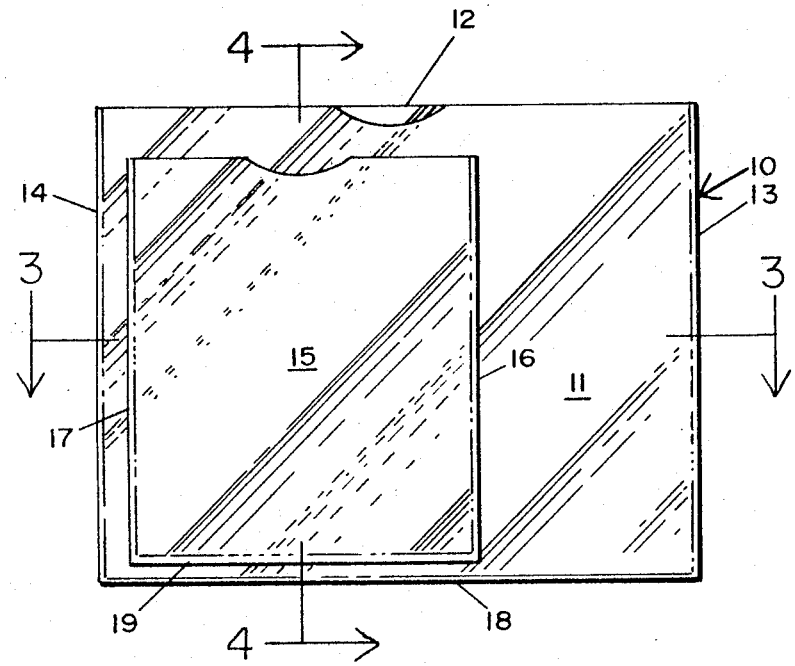
FIGURE 1 is a front elevational view of a holder for X-ray films and reports.
Figure 2:
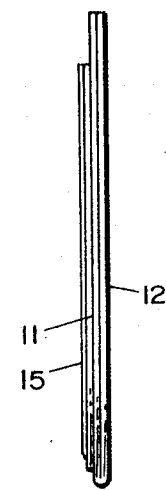
FIGURE 2 is an end view.
Figure 3:
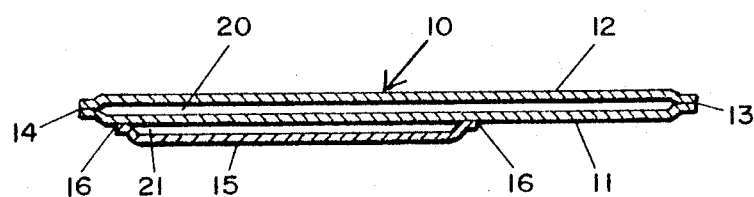
FIGURE 3 is a cross sectional view taken along the line 3—3 of FIGURE 1.
Figure 4:
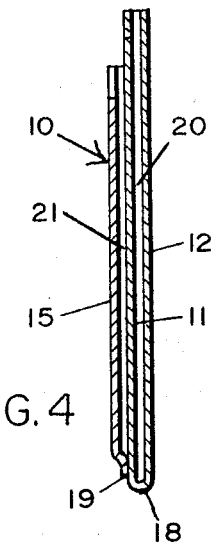
FIGURE 4 is a cross sectional view taken along the line 4—4 of FIGURE 1.

Referring to the drawing wherein like numerals are used to designate similar parts throughout the several views, the numeral 10 refers to a holder for X-ray films and reports consisting of a length of vinyl plastic or any similar transparent material which has been folded at its mid-portion as at 18 to form a front and back wall 11 and 12 respectively. The side edges 13 and 14 are fastened or sealed together preferably by a high frequency electronic sealing machine, though if desired these edges may be sewn together to form a pocket 20 for receiving X-ray films and the like.

On the front wall 11 a second pocket 21 is formed by a smaller sized rectangular sheet of vinyl plastic having its edges 16, 17 and 19 fused to the front wall 11. Within the pocket 21 there is sufficient space to receive and accommodate the reports that concern the particular X-ray films contained in the pocket 20 of the same holder 10. Consequently, the X-ray films and reports are always maintained together. When one department of a hospital, for example, orders the X-ray films the entire holder 10 including the reports will be delivered to the requesting person. When he returns the holder 10 all of the reports will be returned in its pocket 21 along with the X-rays contained in the pocket 20 of the holder 10.

From the foregoing, it is apparent that there is provided herein a transparent holder that contains two pockets 20 and 21 made from two rectangular pieces of vinyl plastic material whose edges are sealed to form a simple, inexpensive and most effective holder wherein the X-ray films and reports will be stored together and made available to an interested person at all times.

What I claim as new and desire to secure by Letters Patent of the United States is:

1. A holder for X-ray films and reports comprising a sheet of vinyl plastic material folded at substantially its mid-portion to form a front and rear wall, side edges of said front and rear wall secured together to form a pocket for X-ray films, a second sheet of vinyl plastic substantially smaller than said front wall in contact relation with said front wall, side and bottom edges of said second sheet being secured to said front wall in spaced relation to said side and bottom edges of said front wall to form a second pocket for reports of said X-ray films.

2. The structure as recited by claim 1 wherein said edges of said front and rear walls are fused together and said vinyl plastic material is transparent.

References Cited

UNITED STATES PATENTS

| 1,693,006 | 11/1928 | Thomas | 150—39 X |
| 2,544,844 | 3/1951 | Liber | 40—159 X |
| 2,918,921 | 12/1959 | Carlston | 40—159 |

EUGENE R. CAPOZIO, Primary Examiner

WENCESLAO J. CONTRERAS, Assistant Examiner